Feb. 18, 1930.	J. G. YONKESE	1,747,563
PONTOON FOR AIRPLANES
Filed Aug. 21, 1922     5 Sheets-Sheet 4
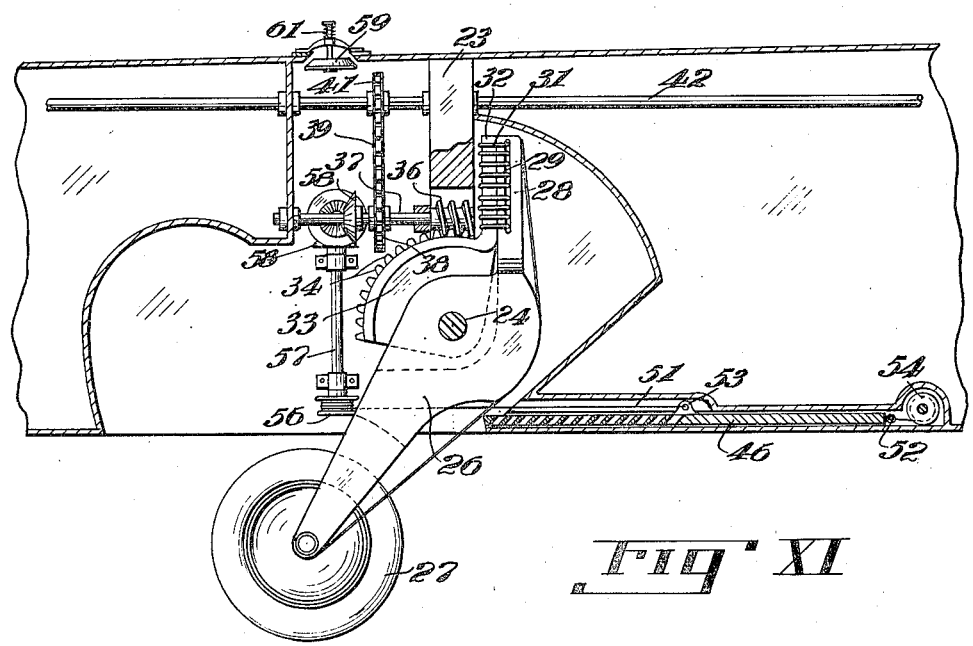
FIG. XI
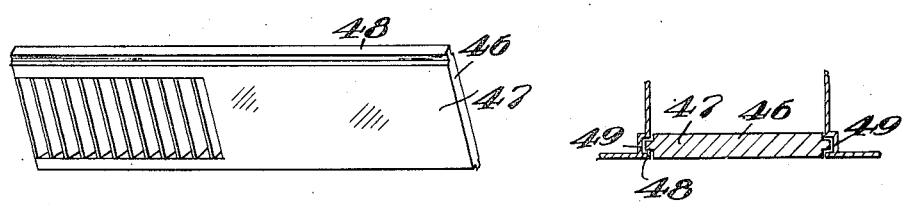
FIG. XII      FIG. XIII
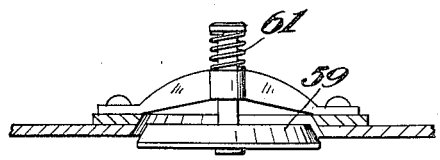
FIG. XIV
INVENTOR
JOSEPH G. YONKESE
By
ATTORNEYS

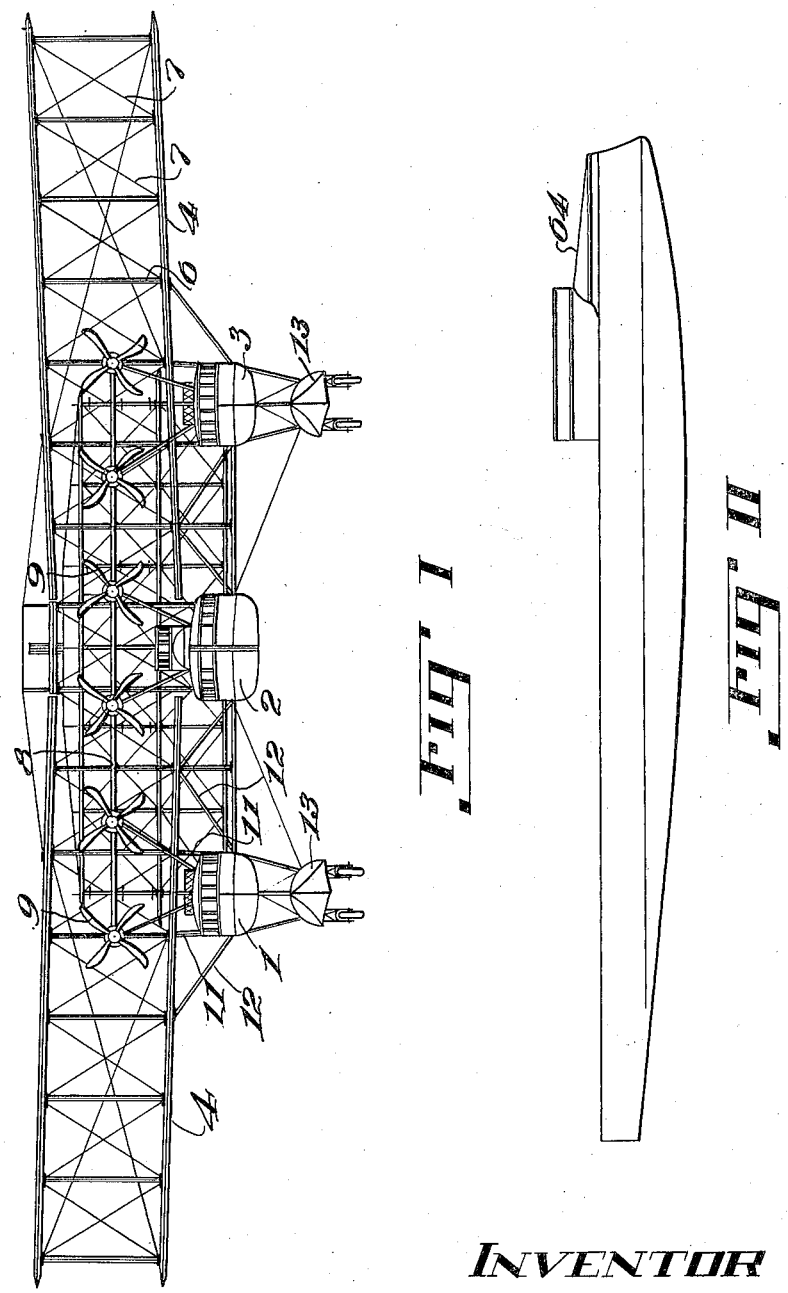

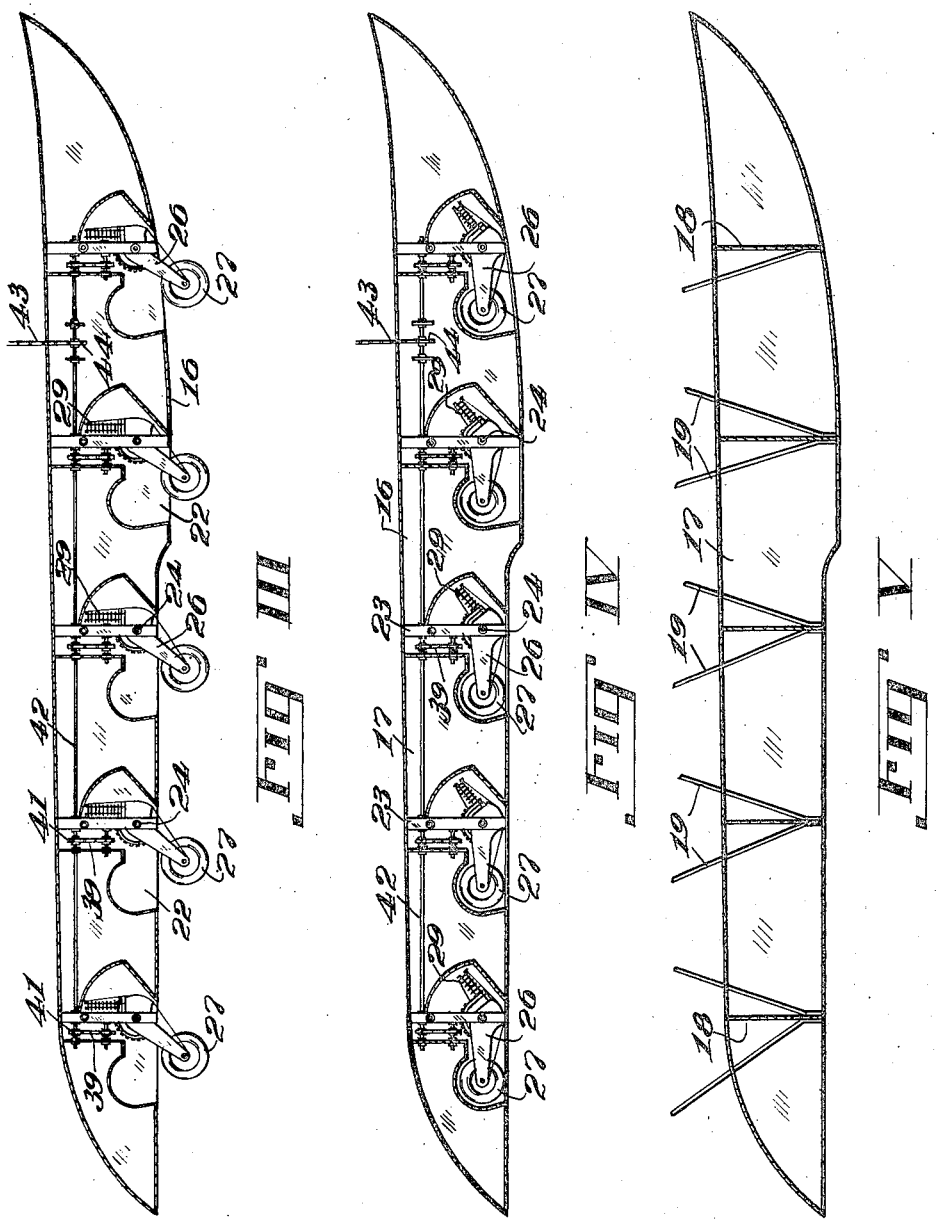

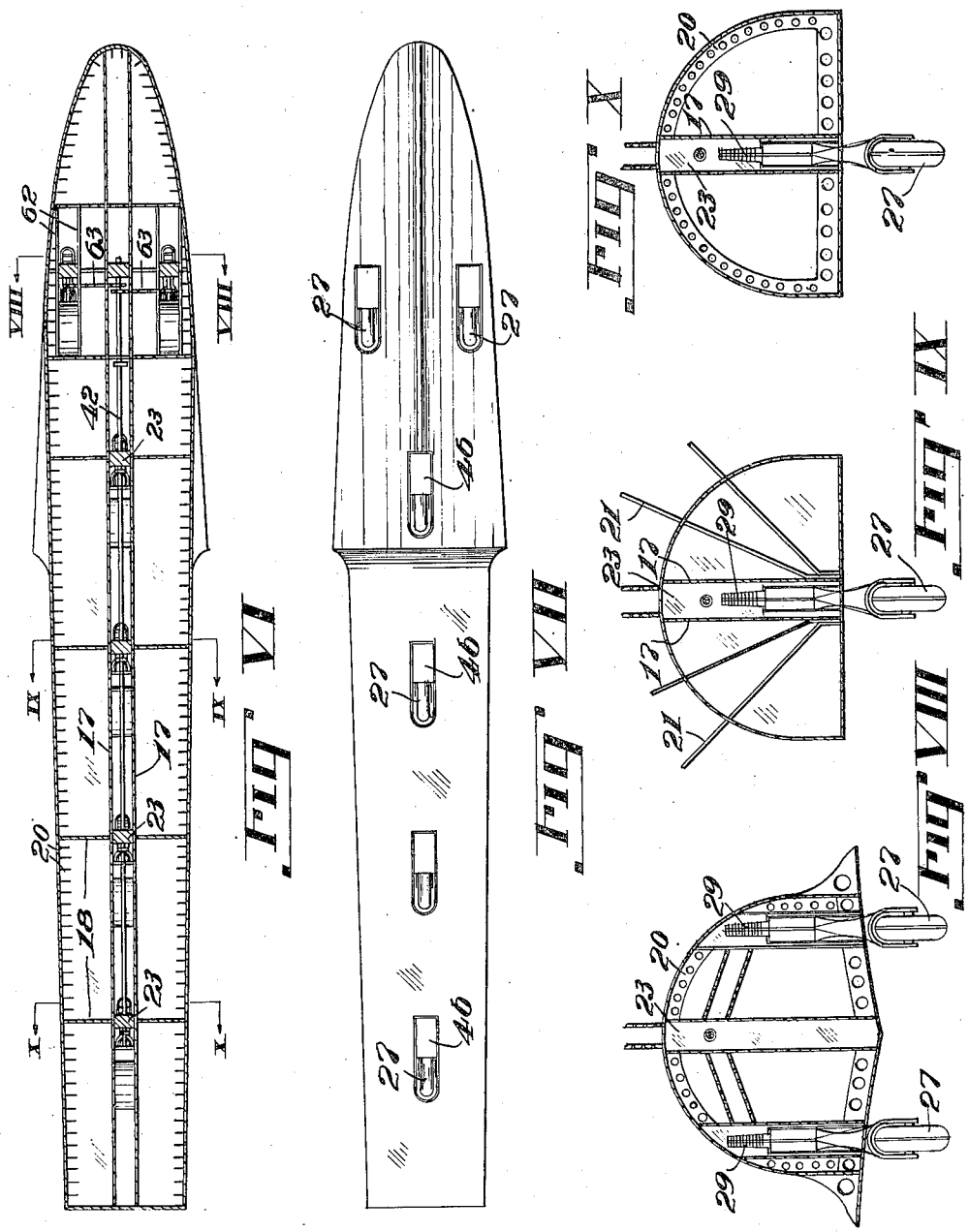

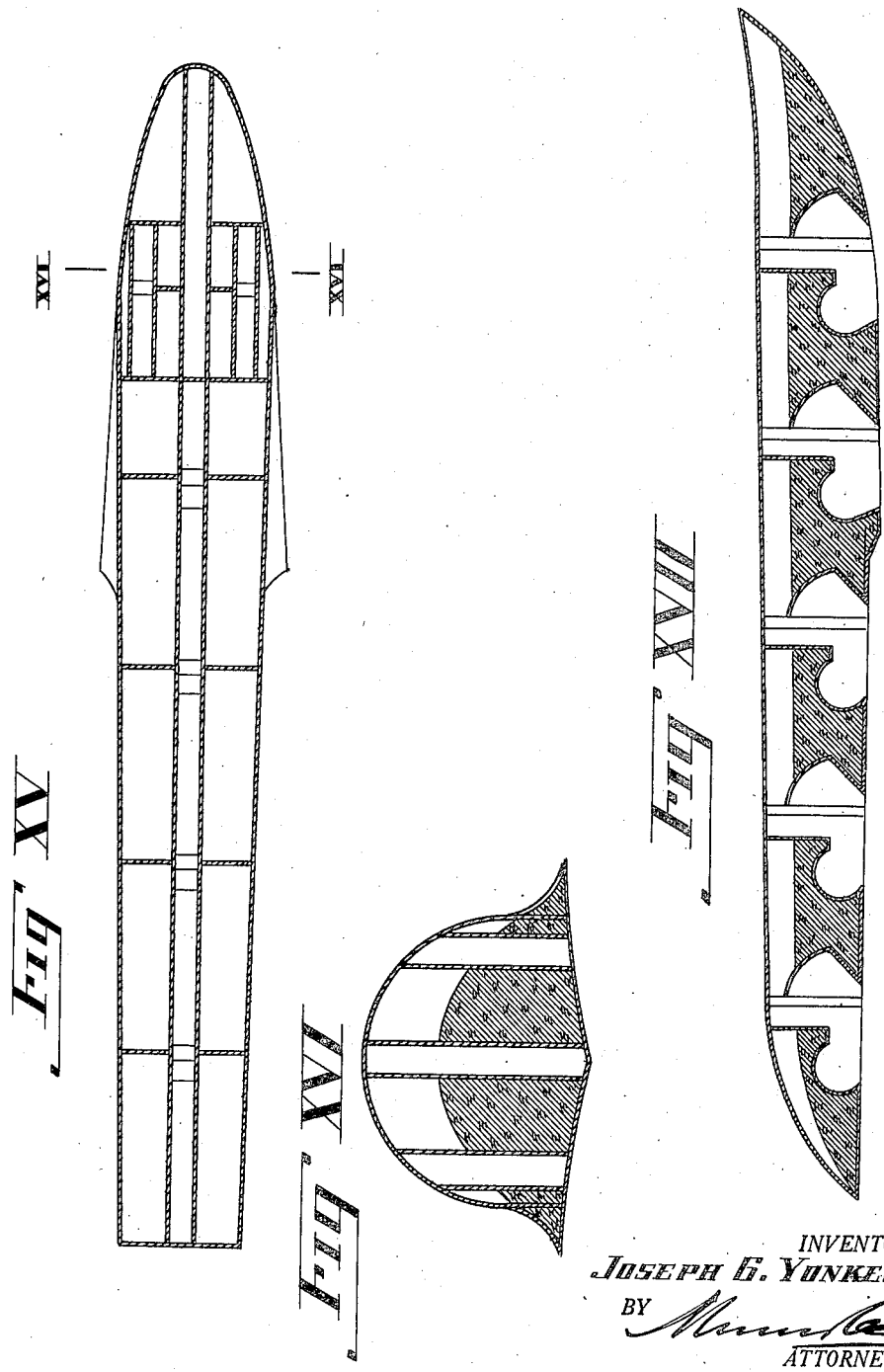

Patented Feb. 18, 1930

1,747,563

UNITED STATES PATENT OFFICE

JOSEPH G. YONKESE, OF CORREGIDOR, PHILIPPINE ISLANDS

PONTOON FOR AIRPLANES

Application filed August 21, 1922. Serial No. 583,266.

The present invention relates to improvements in airplanes and its particular object is to provide means whereby an airplane can be conveniently used as a hydroplane and is also equipped with facilities for traveling on land. I accomplish these objects by the introduction of one or more pontoons which are supported underneath the body of the airplane and which carry enough air space to support the airplane on the water. These pontoons are also equipped with retractable wheels which allow the airplane to travel on the ground surface, but which may be drawn, on account of the particular construction of their mounting means, into the space defined by the outlines of the pontoons so as not to interfere with the travel of the airplane on the water surface.

A further object of the invention is to provide large air chambers in the pontoons which may be filled with gases lighter than air and thus assist in lessening the weight of the pontoons. It is further proposed, as a modification, to fill these chambers with cork or any other light substance that will cause the pontoons to float on the water even though the shell of the same should break or otherwise become damaged.

A further object of the invention is to provide means whereby the pontoons can be secured to the body or bodies of the airplane in a rigid manner so that they are firmly braced longitudinally as well as laterally.

A further object of the invention is to provide suitable means for connecting or combining several body units and a plurality of planes into one assembly of large carrying capacity. Further objects of my invention and advantages of the structural features of the same will appear as the description proceeds.

The preferred form of my invention is illustrated in the accompanying drawings, in which Figure 1 represents a front view of my assembled airplane; Figure 2 a diagrammatic side view of the body of an airplane disclosing the location of the radiator used for cooling the engine; Figure 3 a longitudinal cross section through one of my pontoons showing the landing wheels in their down-ward position; Figure 4 a similar view showing the wheels in their upward position; Figure 5 a longitudinal cross section through the same pontoon along a line parallel to but some distance away from the center line; Figure 6 a horizontal cross section through my pontoon; Figure 7 a bottom plan view of the same; Figure 8 a transverse cross section through the same along line 8—8 of Figure 6; Figure 9 a transverse cross section along line 9—9 of Figure 6; Figure 10 a cross section along line 10—10 of Figure 6; Figure 11 a sectional detail view of a landing wheel and its operating mechanism; Figure 12 a perspective detail view of a shutter used with my pontoon; Figure 13 a cross section through the same showing guide members for the same; Figure 14 a detail view of a suction valve used in my pontoon; Figure 15 a horizontal section through a modified pontoon in which the air spaces are filled with ground cork or similar material; Figure 16 a vertical cross-section through the same along line 16—16 of Figure 15, and Figure 17 a longitudinal vertical section through the same. While I have shown only the preferred form of my invention, I wish to have it understood that various changes or modifications may be made within the scope of the claims hereto attached without departing from the spirit of the invention.

An assembly view of my airplane is shown in Figure 1, from which it will be seen that I provide three bodies (1), (2) and (3) placed alongside of each other and supported by a plurality of wings (4) arranged in biplane fashion, a plurality of struts (6) and wires (7) firmly connecting each two planes forming a pair and maintaining the same in spaced relation to each other. A long transverse shaft (8) is supported between the planes either in front, if a tractor type of airplane is desired, or in the rear if the pusher type is desired. On this shaft are supported a plurality of propellers (9). The planes are connected to the bodies (1), (2) and (3) by strong vertical connecting members (11) and by slanting bracing members (12).

The principal part of the present invention is the pontoons (13), the construction of which is shown in detail in the Figures 3 to 11. Each pontoon comprises a longitudinal hollow body (16) which is constructed very rigidly and fortified by two longitudinal plates (17) extending in parallel relation to each other throughout the length of the pontoon, and by a plurality of transverse plates (18) securing the body of the pontoon against lateral collapse. I further provide a large number of ribs (20) for further strengthening the structure. The plates (17) and (18) not only serve to strengthen the structure but also provide supports for the spacing members connecting the pontoon to its respective body. To render this connection particularly strong and rigid I employ longitudinal as well as lateral connecting members. The longitudinal members (19) are secured to the transverse plates (18), as shown in Figure 4, and extend from the latter in slanting direction to be secured to the bottom of the body of the airplane in any suitable manner. The transverse spacing members (21) are secured to the longitudinal plates (17) as shown in Figure 9 and slant upwardly in a lateral direction to join the bottom of the body of the airplane, as shown in Figure 1. In this manner the pontoon and the airplane body are firmly secured to each other in spaced relation against longitudinal and lateral displacement.

The space left between the two plates (17) is provided with a plurality of recesses (22) opening downwardly and shaped as shown in Figure 3. It will be seen that these recesses form air pockets separated altogether from the air space within the hollow pontoon so that the latter space is air-tightly closed. In each of these recesses is centrally mounted between the plates a post (23). The lower end of the latter is bifurcated as shown in Figure 9 and has journaled therein a shaft (24) on which is pivotally secured an arm (26), carrying at its extreme end a wheel (27) preferably provided with a pneumatic tire. The arm (26) has, as is shown particularly well in Figure 11, an extension (28) in the opposite direction, which extension is provided with a slot (29) into which is wound an elastic band (31) yieldingly securing the extension (28) to a projection (32) of a sector (33) rigidly secured to the shaft (24). The sector is provided with a plurality of teeth (34) on its circumferential surface adapted to be engaged by a worm (36) on a shaft (37), having a sprocket (38) over which is passed a chain (39) actuated by means of a sprocket (41) secured on the shaft (42). The latter may be rotated by the operator in any suitable manner, as for instance by means of the chain (43) engaging a sprocket (44), (see Figure 4). It will be seen that when the operator turns the shaft (42) the worm engages the sector and causes the arm (26) to revolve on the shaft (24) until the wheel (27) reaches its uppermost position and is completely hidden within the recess. On the other hand the worm will act as a lock when the wheel hits the ground surface since the sector (33) cannot actuate the worm owing to the large gearing ratio, so that in that case the sector remains stationary and the wheel can yield only within the limits allowed by the rubber band (31). When in flight or on the water the wheels should be moved to their uppermost position so as to interfere as little as possible with the advance of the airplane. To prevent the recess containing the wheel from hindering the forward motion by causing eddy-currents, I provide a shutter (46) which automatically closes when the wheel is lifted. The shutter is shown in detail in Figures 12 and 13, and consists of a board or plate (47) provided with a longitudinal projection (48) along each side engaging registering recesses (49) within the plates (17). It is operated by means of a cable (51), the ends of which are secured to the shutter in two different places as at (52) and (53) and which is passed over two pulleys (54) and (56). The latter is rigidly secured on a shaft (57) which receives rotary motion through suitable bevel gears (58) from the shaft (37). When this shaft is actuated to draw the wheel upward through the worm (36) engaging the sector (33), the pulley (56) will at the same time pull the shutter (46) forward and thereby close the recess. When the shaft (37) is turned in the opposite direction the pulley (54) will pull on the shutter so as to open the recess. It will be seen from the drawing that the rear end of the shutter is not solid but composed of a number of parallel slats supported in spaced relation. The object of this arrangement is that the water within the recess may readily leave the same when the airplane is beginning to rise.

It will be further noticed that in the top of the recess is provided a valve (59) shown in detail in Figure 14. The latter opens inwardly and is normally seated by means of a spring (61). The purpose of this valve is to allow air to enter the recess when the pontoon rests on the water. If the surface of the water is rough the waves will rise and fall not only along the sides of the pontoon but also within the recess, and when the water falls a vacuum will be naturally created which will suck air into the recess through the valve. This air will oppose to some extent the rise of the water with the rise of the next wave, forming an air cushion which practically keeps the upper portion of the recess clear of water whereby the elastic band is kept from rotting and the metal from rusting. The valve will also assist in facilitating the ascent of the airplane from the water for it will be readily seen that when the airplane rises from the water the latter will recede from the recess and form a vacuum within the same, and the suction of this vacuum would oppose an ascent of the plane if the vacuum could not be filled with air through the valve (59).

It will be seen from Figures 6 and 7 that in the front of the pontoon I provide two landing wheels instead of one. Each landing wheel is supported between two short longitudinal plates (62) both of which are actuated from the shaft (42) by means of chains (63).

In Figure 2 is shown a diagrammatic view of the body of an airplane principally for the purpose of showing the location of my radiator (64) which is not disposed at the front of the body but on top of the same in its front end.

The empty space left in the pontoon which is air-tightly enclosed may be filled with gas lighter than air to assist in overcoming the weight of the pontoon, or it may be filled with cork or any similar light substance that will make the whole pontoon a compact body and at the same time cause the same to float on the water even though the hull of the pontoon may be damaged. The latter pontoon is illustrated in the Figures 15 to 17, in which it is also shown that the lower space only may be filled with cork or the like while the upper space is filled with gas lighter than air. It will be noted that the space within the pontoon above the body of cork is subdivided by the plates 18 into a plurality of non-communicating cells and that the top surface of the body of cork is arched transversely of the length of the pontoon. It will thus be clear that should the wall of the pontoon be punctured at any one point above the body of cork, the entrance of water into the pontoon will be restricted to a single cell, and that due to the arched surface of the body of cork, the entering water will be deflected towards the sides of the cell and thus the force of its impact against the body of cork reduced to a minimum, to thereby preclude damage to the pontoon.

It will be seen from the foregoing description that the essential features disclosed in my application make it possible for an airplane to be used as a hydroplane since the pontoons will support the body or fusilage of the plane a considerable distance above the water. The retractable wheels not only facilitate the landing operation but also allow the airplane to travel on the ground surface. When not used they may be drawn upward into the pontoon so as not to interfere with the forward motion of the plane either in the air or on the water, and suitable means are provided for preventing the recess from forming eddy-currents in the shutters (46) so that when the wheels are not used they may be placed in a position where they do not interfere in the least with the operation of the plane.

I claim:

1. A floating pontoon of the character described comprising an elongated hollow body forming a plurality of recesses opening downwardly, a plurality of landing wheels mounted in said recesses so as to normally extend beyond the bottom surface of the body having means associated therewith for drawing them into the recess altogether, and a shutter for closing each recess having a plurality of slots arranged in slanting and spaced relation for allowing water to recede through the same.

2. A pontoon of the character described comprising an elongated hollow body forming a plurality of recesses opening downwardly, a plurality of landing wheels mounted in said recesses so as to normally extend beyond the bottom surface of the body having means associated therewith for drawing them into the recess altogether, and a port leading from the recess to the upper surface of the body having a suction valve therein for allowing air to enter the recess when a partial vacuum is created therein through the falling of the water within the same.

3. In combination with an airplane, a pontoon comprising an elongated hollow body having two central longitudinal bracing plates extending throughout its length in spaced relation, a plurality of recesses between said two bracing plates, a vertical post supported between the plates in each recess, a wheel arm pivotally supported in each post, a landing wheel on each arm, and means associated with each wheel arm for normally maintaining each wheel in an operative position underneath the body adapted to draw the wheel into the recess.

4. In combination with an airplane, a pontoon comprising an elongated hollow body having two central longitudinal bracing plates extending throughout its length in spaced relation, a plurality of recesses between said two bracing plates, a vertical post supported between the plates in each recess, a wheel arm pivotally supported in each post, a landing wheel on each arm, and means associated with each wheel arm for normally maintaining each wheel in an operative position underneath the body adapted to draw the wheel into the recess, said means comprising a toothed sector associated with each wheel arm, a worm engaging said teeth, and means for manipulating said worm.

5. In combination with an airplane, a pontoon comprising an elongated hollow body filled with lighter than water material having two longitudinal plates extending therethrough and lateral plates traversing the same, laterally slanting supporting members for the airplane secured to the longitudinal plates, and longitudinally slanting supporting members secured to the lateral plates.

6. In combination with an airplane, a pontoon comprising an elongated hollow body filled with lighter than water material having two longitudinal plates extending therethrough and lateral plates traversing the same, laterally slanting supporting members for the airplane secured to the longitudinal plates, and longitudinally slanting supporting members secured to the lateral plates, with downwardly opening recesses formed between the longitudinal plates for accommodating retractible landing wheels.

7. In combination with an airplane, a pontoon provided with a plurality of recesses, a plurality of landing wheels mounted in said recesses and adapted to normally extend from said recesses and having means associated therewith for retracting the wheels into the recesses, said means comprising a pivotally mounted arm, a wheel rotatably mounted at the lower end of the arm, said arm being provided with an upward extension, a gear sector having an extension, an elastic band connecting the two extensions but permitting relative movements between said extensions to absorb the shocks incident to landing, and means for positively actuating the sector for causing oscillation of the arm for moving the wheel into the recess of the pontoon.

8. In combination with an airplane, a pontoon provided with a plurality of recesses, a plurality of landing wheels mounted in said recesses and adapted to normally extend from said recesses and having means associated therewith for retracting the wheels into the recesses, said means comprising a pivotally mounted arm, a wheel rotatably mounted at the lower end of the arm, said arm adjacent its pivot being provided with a pocket, a sector mounted on the same pivot point of the arm and disposed within the pocket, said arm being provided with an upward extension, a gear sector having an extension disposed adjacent the upward extension on the arm, elastic means connecting the two extensions for simultaneous movement but permitting relative movement between said extensions to absorb the shocks incident to landing, a worm operatively connected with the sector, and means for operating the worm causing oscillation of the sector and likewise the oscillation of the arm for moving the wheel into the recess.

9. In combination with an airplane, a pontoon provided with a plurality of recesses, a plurality of landing wheels mounted in said recesses and adapted to normally project below the pontoon and having means associated therewith for moving the wheels into the recess, said means comprising an axle, an arm pivotally mounted intermediate its ends on the axle with one portion of the arm projecting through the recess and below the bottom of the pontoon, a wheel rotatably mounted at the lower end of the extended portion of the arm, the arm having an extension above the axle, said arm being provided with a recess adjacent the axle, a sector located in the recess and pivotally mounted on the axle and provided with an extension located adjacent the extension on the arm, elastic means connecting the two extensions together for permitting relative movements between said extensions to absorb shocks incident to landing, the elastic means providing for simultaneous rocking of the arm and sector when the sector is rocked, and means for positively actuating the sector for causing oscillation of the arm for moving the wheel into the recess of the pontoon.

10. A pontoon having a recess closed with respect to the top of the pontoon and opening to its bottom, a retractable landing gear in the recess, the closed top of the recess having a port, a valve for the port opening inwardly of the recess, and means for normally urging the valve normally to close the port, so that when the pontoon is in the water, air will be trapped in the recess above the water and will form a cushion acting to oppose the rising of the water in the recess, said urging means rendering the valve free to open to admit air to the recess through the port in the event of a partial vacuum being created in the recess as a result of the lowering of the water level in the recess.

JOSEPH G. YONKESE.